May 10, 1966  J. A. SMITH  3,250,010
MULTIPLE-SCALE STORY POLE

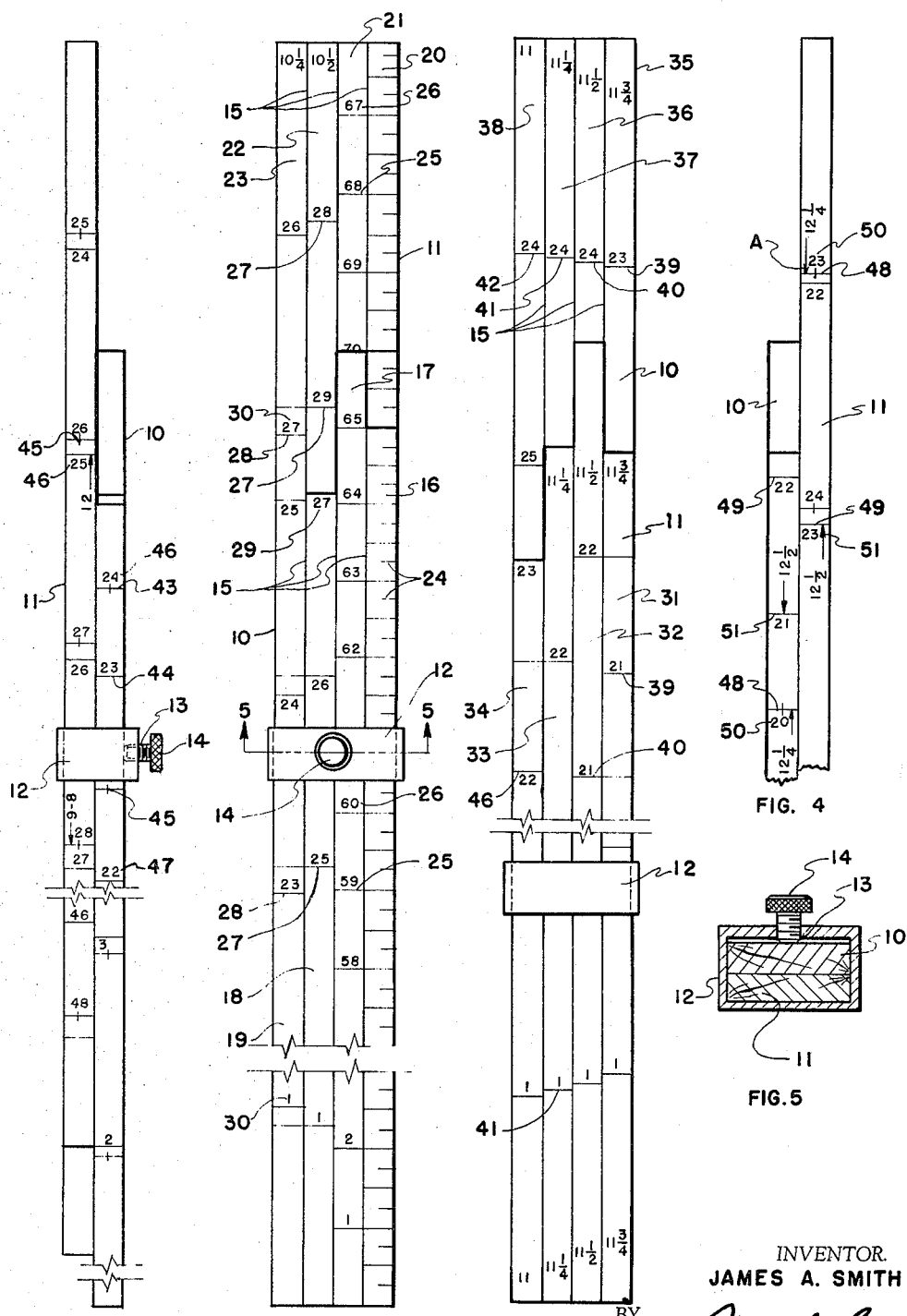

Filed July 2, 1964  2 Sheets-Sheet 2

INVENTOR.
JAMES A. SMITH
BY
ATTORNEY

United States Patent Office 3,250,010
Patented May 10, 1966

3,250,010
MULTIPLE-SCALE STORY POLE
James A. Smith, Glennie, Mich.
Filed July 2, 1964, Ser. No. 379,896
4 Claims. (Cl. 33—161)

This invention relates to multiple-scale story poles for use in measuring the number of courses of brick, block or the like in a given wall or portion thereof and in choosing the scale or scales of coursing to be employed in the erection of a wall of specified height. More particularly, the invention relates to a story pole in which one of the ends of each respective portion thereof is stepped in accordance with scalar graduations thereon.

An object of my invention is to provide a story pole which can be calibrated in courses according to commonly employed scales which are standard in the trade, and which eliminates or simplifies much of the computation presently necessary in this type of construction work.

Another object of the invention is to provide an extensible story pole, which when extended, will be of the average story height of conventional building structures, and which can be read at eye level, even though the pole is extended beyond the eye level of the average person.

Another object of the invention is to provide a story pole which accommodates a maximum number of coursing scales and yet can be very easily and clearly read without confusion.

Another object of the invention is to design a story pole which permits the choosing of scales so that a non-fractional number of courses of brick or the like can be laid to a height closely approximating a specified height, or will make possible the ready and accurate division of heights over or under the height of the number of courses to be laid, by providing a plurality of scales so that a combination of scales may be chosen which will accommodate to the specified height.

A further object of the invention is to provide a story pole which permits a scale of courses per inches to be readily chosen, and which conforms to the height under and over window and door openings and the like.

Still a further object of the invention is to design a story pole which will greatly simplify the art of bricklaying and masonry, and which can be employed in the instruction of apprentice bricklayers and masons.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

FIG. 1 is an elevational view of one face of the story pole.

FIG. 2 is an edge elevational view thereof.

FIG. 3 is an elevational view of the opposite face of the story pole, the pole having been turned end-for-end.

FIG. 4 is a fragmentary, edge elevational view of the story pole opposite to the view shown in FIG. 2.

FIG. 5 is a transverse sectional view taken on the line 5—5 of FIG. 1.

Figure 7:
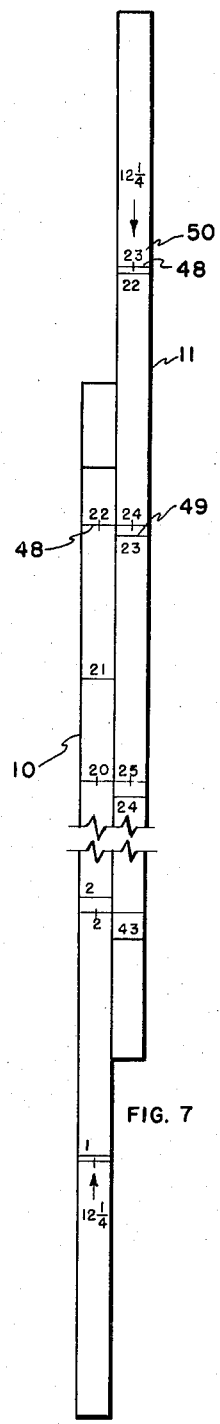
FIG. 7 is an edge elevational view similar to FIG. 4, except that the pole is in more extended position in which certain of the graduations on the juxtaposed sections thereof are in alignment.

Referring now more particularly to the accompanying drawings in which I have shown the preferred embodiment of my invention, the numerals 10 and 11 generally indicate the calibrated bars of equal length which comprise my novel story pole, and as will be seen, these bars are retained in telescoping relation by a pair of keepers 12 (only one of which is shown in the drawings).

The keepers 12 which embrace the juxtaposed bars 10 and 11 are normally freely slidable thereon and are provided with threaded openings 13 to accommodate setscrews 14 which secure the bars in various adjusted positions. Both faces of the bars 10 and 11 are longitudinally grooved or lined as at 15 to divide them into panels which are graduated in courses and units of linear measure in a manner which will now be described.

While it is clear that the bars could be graduated in courses of stone and blocks as well as bricks, the pole will be described for convenience sake as a bricklayer's tool, and the courses referred to will be courses of brick. The outer face of the bar 10 is divided into panels 16, 17, 18, and 19, and the inner face of the bar 11 is divided into matching panels 20, 21, 22 and 23. The panels 16 and 20 may be graduated in fractional inch units 24, and the panels 17 and 21 in inch indicia 25, and as shown, the numerals 26 designating inches on the bar 10 number from bottom to top in FIG. 1, and on the bar 11 from top to bottom.

The panels 18 and 22, and 19 and 23 are shown graduated as at 27 and 28 respectively in courses, the numerals 29 and 30 in these sets of panels similarly numbering from bottom to top on the bar 10, and from top to bottom on the bar 11. The graduation lines 27 and 28 are placed with reference to scales of four courses per 10½ inches and four courses per 10¼ inches respectively, which are commonly used standards in the bricklaying trade. The end of the bar 10 is stepped as shown to permit the story pole to be read, the various panels 16–19 terminating at designated indicia lines 24, 25, 27 and 28.

The outer face of the bar 11 and inner face of the bar 10 are shown in FIG. 3, the story pole having been inverted and turned end-for-end. These faces of the pole have similarly been divided into panels 31, 32, 33, 34, and mating panels 35, 36, 37, and 38 respectively, and the panels have been calibrated accordingly to scales of four courses per 11¾ inches, four courses per 11½ inches, four courses per 11¼ inches, and four courses per 11 inches. Graduation lines 39, 40, 41 and 42 on the panels 31 and 35, 32 and 36, 33 and 37, and 34 and 38 respectively, designate the courses, and as will be seen, the various numerals in FIG. 3 designating the courses, run from bottom to top on bar 11 and top to bottom on bar 10. This end of the bar 11 is also stepped, the panels 31–34 terminating at the various graduation lines 39–42.

The sides of the bars are also calibrated in courses according to commonly employed standards or scales. In FIG. 2, the side of the bar 10 is provided with two sets of course graduations 43 and 44, the graduations 43 being distinguished from the graduation 44 by a cross mark 45, although clearly, a line of another color or some other suitable distinguishing symbol could be employed.

The corresponding edge of the bar 11 is provided with similar graduations 43 and 44, and it will be seen that the numerals 46 and 47 designating the numerals for the graduations 43 and 44 run from bottom to top on the bar 10 and from top to bottom on the bar 11, the graduations 43 indicating courses according to a scale of four courses per 12 inches, and graduations 44 indicating courses according to a scale of three courses per 8 inches. The scale of three courses to 8 inches is commonly employed where cinder blocks and the like are used in courses with brick at spaced heights.

In FIG. 4, the opposite edge of the story pole is shown, and it will be apparent that graduations 48 and 49 are provided on the opposite edge of the bar 11, and the opposite edge of the bar 10, the numerals 50 designating the crossed graduations 48 running from bottom to top on the bar 11, and from top to bottom on bar 10, and the numerals 51 designating the graduations 49 running similarly from bottom to top on the bar 11, and top to bottom on the bar 10. It will be seen that arrows A on both edges of the bars 10 and 11 indicate to which scale of coursing each graduation belongs.

The story pole is read in the following manner. With the pole in upright position and the face shown in FIG. 1 facing the workman, the bar 11 is extended to the height desired to be measured, if the height is greater than 66 inches. In the instant case, the height may be read in inches by noting the position of the end of the panels 16 and 17 relative to the panels 20 and 21, and in FIG. 1, the height, of course, is 70 inches. This reading may be taken at the average person's eye level of near 66 inches, since the numerals 26 on the bars 10 and 11 run in opposite directions, and the convenience of this feature will be appreciated when the story pole is extended to reach greater heights in the region of 7–10 feet.

With reference now to panels 18 and 22 and 19 and 23, it will be seen that at four courses, to 10½ inches, about 29½ courses of brick would be required, and at four courses to 10¼ inches, about 27⅓ courses would be required. These readings, of course, are similarly taken at eye level. If the story pole is now turned end-for-end and inverted so that the opposite face thereof faces the workman, it will be seen that at four courses to 11 inches, slightly less than 25½ courses will be required; at four courses to 11¼ inches, not quite 25 courses will be needed; at four courses to 11½ inches, about 24⅓ courses will be required; and at four courses to 11¾ inches, not quite 24 courses will be required.

If the story pole in the position shown in FIG. 3 is read from the edge illustrated in FIG. 4, it will be apparent that neither the cross graduations 48 nor the graduations 49 coincide on the respective bars. The readings are taken at the graduation 48 or 49 on the bar 11 nearest the upper end of the panel 16, and it will be noted that at four courses to 12½ inches, approximately 23 courses would be required, and at four courses to 12¼ inches, approximately 24 courses would be required. Similarly, if the pole were read from the opposite edge (FIG. 2), the reading would be taken at the graduation 43 or 44 nearest the upper end of the panel 19 and accordingly at four courses to 12 inches, approximately 25¼ courses would be required, and at three courses to 8 inches, approximately 26⅓ courses would be required. In none of these cases is the number of courses required non-fractional; however, it will be noted that at four courses to 11¼ inches (panel 33), almost 25 full courses would be required.

Figure 6:
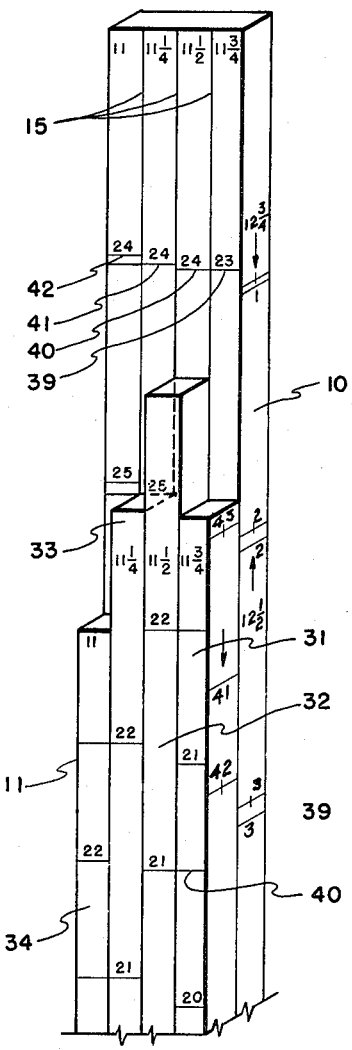
FIG. 6 is a fragmentary, perspective view of the end of the pole which is uppermost in FIG. 3, illustrating an extended position thereof.

If it were possible, it would be expedient for the architect or builder to change the height of the wall or window opening in the wall so that 25 full courses, at four courses to 11¼ inches would be required, and this height is computed by merely extending the bar 10 until the upper edge of the panel 33 was over the graduation line numerals 25 on the panel 37 (see FIG. 6). Now inverting the story pole and turning it end-for-end, it will be seen that the new height would be about 70¼ inches. If it were not possible to alter the height to which the courses extend, the brick would be laid in 25 courses and the approximately one-fourth of an inch "to be lost" could be dissipated by laying four of the courses at four courses to 11¼ inches. Similarly, in cases where it is necessary to gain height in order to lay full courses to a given height a scale such as four courses to 11½ inches could be used to lay a panel containing the number of courses necessary at that scale to make up the required height.

For heights less than 66 inches, the number of courses are read directly from the bar 10 if the stepped end of the bar 10 is at the top of the pole, or directly from the bar 11 if the story pole is inverted and turned end-for-end so that the stepped edge of the bar 11 is at the top of the pole. At those heights, the scale of coursing which will most nearly permit full courses of brick to be laid at a given height, of course, is chosen.

FIG. 7 is a view similar to FIG. 4, except that the bar 10 is extended and in this instance it will be seen that the crossed graduations 48 on the bars 10 and 11 coincide. Reading the pole at four courses to 12¼ inches, 24 full courses would be required. When using the pole, it will be easy to keep the correct face of the pole facing the workman, since the numerals would otherwise be upside down.

While I have described the pole as used by architects, builders, and bricklayers, it will also be obvious that the estimator could readily approximately determine the number of bricks needed in a given wall without counting them by using the device to find the number of courses in the wall and multiplying by the length of the wall and the number of bricks required per unit of length. Allowances for window and door openings could be made in a similar manner and subtracted, and gables and the like also could be readily estimated.

It will thus be apparent that I have perfected a very simple and practical story pole which can be very readily employed by workmen and skilled artisans alike. It is to be understood that various equivalent changes may be made in the various elements which comprise the device without departing from the spirit of the invention or the scope of the appended claims.

What is claimed is:

1. In a story pole; a pair of elongated juxtaposed telescoping bars in face to face engagement with one bar being extensible relative to the other; a plurality of different lengthwise scales each scale comprising spaced apart progressively numbered graduations numeraled lengthwise on a face of the relatively stationary bar indicating in courses according to a scale of courses per inch of length designated lengths thereon; identical continuing scales on the complementary face of the extensible bar progressively numbered in the opposite direction relative to the upper end thereof with numbers beginning from the last numbers of each of the scales on the relatively stationary bar so that the number of courses in the length of said pole may be read according to the scale of courses most nearly fitting the length thereof at the last number in a scale on the relatively stationary bar depending on the scale chosen, the relatively stationary bar covering part of the scale on the relatively extensible bar when the latter is in various extended positions; the upper end of the relatively stationary bar terminating at different points lengthwise on the relatively stationary member corresponding to the end of a scale so that the terminus of each scale with respect to the portions of the identical scales on the extensible bar remaining uncovered may be compared.

2. In a story pole, a pair of elongated members supported in telescoping relation with one of said members being extensible relative to the other, the outer face of the said other member having a plurality of lengthwise panels defined thereon, and the adjacent face of the extensible member having co-extensive panels defined thereon, spaced apart, progressively numbered graduations for the panels on the said other member indicating in units according to a scale of units per subdivision of length the length of the member from one end thereof, identically spaced apart, graduations for the co-extensive panels on the extensible member progressively numbered in the opposite direction from the outer end thereof with numbers continuing from the highest numbers on said panels on the said other member, said graduations for the panels being differently spaced apart according to different scales, the end of the said other member from which said extensible member is extensible being stepped with at least certain of said steps being the terminus of a panel of graduations.

3. In a story pole, a pair of superposed bars, means maintaining said bars in juxtaposed position while permitting one to be extensible relative to the other, the outer face of the stationary bar being divided into lengthwise panels, and the inner face of the extensible bar being divided into panels co-extensive therewith, spaced-apart, progressively numbered graduations for the panels on the stationary bar indicating, in courses, according to a scale of courses per unit of length, the length of the bar from one end thereof, identically spaced-apart graduations for the co-extensive panels on the extensible bar progressively numbered in the opposite direction from the outer end thereof, with numbers continuing from the highest numbers in said panels on the stationary bar, said graduations for the panels being differently spaced-apart according to different scales, the panels of the stationary bar terminating at said highest graduations on each of said panels so that the common terminus thereof is stepped, the outer face of said extensible bar and the inner face of said stationary bar being divided into co-extensive lengthwise panels, spaced-apart, progressively numbered graduations for the panels on the outer face of said extensible bar according to differing scales of courses per unit by length and indicate the length of the bar from said outer end thereof, spaced-apart graduations for the panels on the inner face of said stationary bar identical with the graduations on the outer face of said extensible bar numbered in the opposite direction, said numbers beginning from the same end thereof from which the graduations on the opposite face thereof commence, with the numbers continuing from the highest numbers in said panels on the outer face of the extensible bar, the panels on the outer face of the extensible bar terminating at said highest numbered graduations on each of said panels, so that the one end of the extensible bar is stepped and the pole can be inverted and turned end-for-end and the number of courses read thereat.

4. In a story pole, a pair of superposed bars, means maintaining said bars in juxtaposed position while permitting one to be extensible relative to the other, the faces of said bars being divided into identical lengthwise panels, progressively numbered graduations upon each panel of the outer face of the stationary bar indicating in units the length thereof, and identical graduations upon each complementary panel of the outer face of the extensible bar, the graduations of the several pairs of mutually complementary panels being spaced according to different scales, the graduations upon said extensible bar being progressively numbered in the opposite direction from the outer end thereof with numbers beginning from the last number on the stationary bar so that the length of said pole may be read in units at the last number on said stationary bar, and the panels of said stationary bar terminating at the last graduations of each of said panels so that the end of said bar is stepped and the several panels can be read concurrently, and progressively numbered graduations upon an edge of said stationary bar indicating in units the length from one end thereof, and identically spaced graduations provided on the adjacent edge of the extensible bar progressively numbered in the opposite direction from the outer end thereof with numbers commencing from the last number on the stationary bar, said graduations on the edges of said bars being spaced according to a different scale than those on the faces of said bars.

References Cited by the Examiner

UNITED STATES PATENTS

| | | | |
|---|---|---|---|
| 1,558,879 | 10/1925 | Hoare | 33—161 |
| 1,594,862 | 8/1926 | Unverferth | 33—111 |
| 1,614,577 | 1/1927 | Tetrick | 33—161 |
| 2,140,714 | 12/1938 | Palmer | 33—111 |
| 2,904,891 | 9/1959 | Cook | 33—111 |

LEONARD FORMAN, *Primary Examiner.*

ROBERT B. HULL, W. D. MARTIN,
*Assistant Examiners.*